(12) United States Patent
Oota et al.

(10) Patent No.: US 11,554,574 B2
(45) Date of Patent: Jan. 17, 2023

(54) INTERLAYER FILM FOR LAMINATED GLASS AND LAMINATED GLASS

(71) Applicant: SEKISUI CHEMICAL CO., LTD., Osaka (JP)

(72) Inventors: Yuusuke Oota, Kouka (JP); Masaki Matsudou, Kouka (JP); Daizou Ii, Kouka (JP); Ryuta Tsunoda, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/759,827

(22) PCT Filed: Sep. 29, 2016

(86) PCT No.: PCT/JP2016/078916
§ 371 (c)(1),
(2) Date: Mar. 13, 2018

(87) PCT Pub. No.: WO2017/057630
PCT Pub. Date: Apr. 6, 2017

(65) Prior Publication Data
US 2018/0264785 A1    Sep. 20, 2018

(30) Foreign Application Priority Data

Sep. 30, 2015    (JP) .............................. JP2015-195407

(51) Int. Cl.
*B32B 17/10*    (2006.01)
*B29C 48/13*    (2019.01)
(Continued)

(52) U.S. Cl.
CPC ........ *B32B 17/10568* (2013.01); *B29C 48/13* (2019.02); *B32B 3/26* (2013.01);
(Continued)

(58) Field of Classification Search
CPC ........... B32B 3/26; B32B 3/263; B32B 5/142; B32B 7/02; B32B 7/12; B32B 17/06;
(Continued)

(56) References Cited

U.S. PATENT DOCUMENTS 4,180,620 A * 12/1979 Inskip ............... B32B 17/10688
428/524
6,673,456 B1    1/2004 Kobata et al.
(Continued)

FOREIGN PATENT DOCUMENTS

| CN | 101038349 A | 9/2007 |
|---|---|---|
| JP | 4-502525 A | 5/1992 |

(Continued)

OTHER PUBLICATIONS

Written Opinion of the International Searching Authority (PCT/ISA/237) for Application No. PCT/JP2016/078916 dated Jan. 10, 2017 (English Translation dated Apr. 12, 2018).
(Continued)

*Primary Examiner* — Z. Jim Yang
(74) *Attorney, Agent, or Firm* — Cheng Law Group, PLLC

(57) ABSTRACT

There is provided an interlayer film for laminated glass with which the visibility can be made uniform over the whole area of laminated glass. The interlayer film for laminated glass according to the present invention contains a thermoplastic resin and a heat shielding compound and has one end and the other end being at the opposite side of the one end and having a thickness thicker than the one end, the absolute value of a difference between the thickness of a thickest portion and the thickness of a thinnest portion is 0.1 mm or more, and in a sheet of laminated glass prepared by sandwiching the interlayer film between two sheets of heat ray-absorbing plate glass with a thickness of 2.1 mm, the
(Continued)

absolute value of a difference between the visible light transmittance at the thickest portion of the interlayer film and the visible light transmittance at the thinnest portion of the interlayer film is 4% or less.

17 Claims, 3 Drawing Sheets

(51) Int. Cl.
| | |
|---|---|
| *B32B 3/26* | (2006.01) |
| *B32B 27/18* | (2006.01) |
| *B29C 48/08* | (2019.01) |
| *B29C 48/21* | (2019.01) |
| *B60J 1/00* | (2006.01) |
| *B60J 1/02* | (2006.01) |
| *B29K 31/00* | (2006.01) |
| *B29L 31/30* | (2006.01) |
| *B29L 31/00* | (2006.01) |

(52) U.S. Cl.
CPC .............. *B32B 3/263* (2013.01); *B32B 17/10* (2013.01); *B32B 17/1011* (2013.01); *B32B 17/10541* (2013.01); *B32B 17/10633* (2013.01); *B32B 17/10761* (2013.01); *B32B 27/18* (2013.01); *B29C 48/08* (2019.02); *B29C 48/21* (2019.02); *B29K 2031/04* (2013.01); *B29L 2031/30* (2013.01); *B29L 2031/778* (2013.01); *B32B 2605/006* (2013.01); *B60J 1/00* (2013.01); *B60J 1/001* (2013.01); *B60J 1/02* (2013.01)

(58) Field of Classification Search
CPC ............ B32B 17/064; B32B 17/10293; B32B 17/10339; B32B 17/10431; B32B 17/1055; B32B 17/10559; B32B 17/10614; B32B 17/10633; B32B 17/10651; B32B 17/1066; B32B 27/06; B32B 27/08; B32B 27/18; B32B 2250/05; B32B 2307/71; B32B 2551/00; B32B 2605/006; B32B 17/10–1099; Y10T 428/24479; Y10T 428/24504; Y10T 428/24612; Y10T 428/24802; Y10T 428/24851; Y10T 428/24926; Y10T 428/24942; Y10T 428/2495; Y10T 428/24959; B60J 1/00–06
USPC ........ 428/114, 156, 157, 159–164, 168, 172, 428/195.1, 204, 206, 207, 210, 212, 213, 428/214
See application file for complete search history.

(56) References Cited

U.S. PATENT DOCUMENTS

| | | | |
|---|---|---|---|
| 2002/0039649 A1* | 4/2002 | Nagai | B60J 1/002 428/328 |
| 2005/0181220 A1 | 8/2005 | Kobata et al. | |
| 2006/0008640 A1 | 1/2006 | Chonan et al. | |
| 2007/0148472 A1 | 6/2007 | Masaki et al. | |
| 2008/0176043 A1* | 7/2008 | Masaki | G02B 27/0101 428/172 |
| 2012/0164409 A1* | 6/2012 | Masaki | B32B 17/10174 428/203 |
| 2013/0149503 A1 | 6/2013 | Yamamoto et al. | |
| 2013/0194659 A1 | 8/2013 | Hatta et al. | |
| 2014/0193646 A1 | 7/2014 | Kitano et al. | |
| 2015/0217540 A1* | 8/2015 | Keller | B32B 17/10605 428/323 |
| 2015/0251377 A1* | 9/2015 | Cleary | B32B 17/10036 428/172 |
| 2016/0096346 A1* | 4/2016 | Nakamura | B32B 17/10633 428/203 |
| 2016/0288460 A1* | 10/2016 | Nakayama | B32B 3/263 |
| 2016/0288465 A1* | 10/2016 | Nakayama | B32B 17/10688 |
| 2016/0289362 A1* | 10/2016 | Wade | B32B 27/08 |
| 2017/0072663 A1* | 3/2017 | Sadakane | G02B 27/0101 |
| 2017/0334173 A1* | 11/2017 | Yui | B32B 17/10678 |
| 2017/0341347 A1* | 11/2017 | Nakamura | E06B 3/6707 |
| 2018/0281570 A1* | 10/2018 | Labrot | B60J 3/04 |
| 2018/0326706 A1* | 11/2018 | Oota | B32B 17/10761 |
| 2018/0348516 A1* | 12/2018 | Sadakane | G02B 27/0018 |
| 2019/0105878 A1* | 4/2019 | Nakamura | B32B 17/1055 |
| 2020/0391488 A1* | 12/2020 | Oota | B32B 17/10761 |

FOREIGN PATENT DOCUMENTS

| | | | |
|---|---|---|---|
| JP | 10-77360 A | | 3/1998 |
| JP | 2004203680 A | * | 7/2004 |
| JP | 2007-223883 A | | 9/2007 |
| JP | 2008-201667 A | | 9/2008 |
| WO | WO-91/06031 A1 | | 5/1991 |
| WO | WO-01/25162 A1 | | 4/2001 |
| WO | WO-2005/087680 A1 | | 9/2005 |
| WO | WO-2012/023616 A1 | | 2/2012 |
| WO | WO-2012/029916 A1 | | 3/2012 |
| WO | WO-2014077328 A1 | * | 5/2014 ....... B32B 17/10036 |
| WO | WO-2014/132866 A1 | | 9/2014 |

OTHER PUBLICATIONS

International Search Report for the Application No. PCT/JP2016/078916 dated Jan. 10, 2017.
Written Opinion of the International Searching Authority (PCT/ISA/237) for Application No. PCT/JP2016/078916 dated Jan. 10, 2017.
Supplementary European Search Report for the Application No. EP 16 851 801.7 dated Apr. 30, 2019.
European Office Action for the Application No. 16 851 801.7 dated Aug. 5, 2022.

* cited by examiner

[FIG. 1]
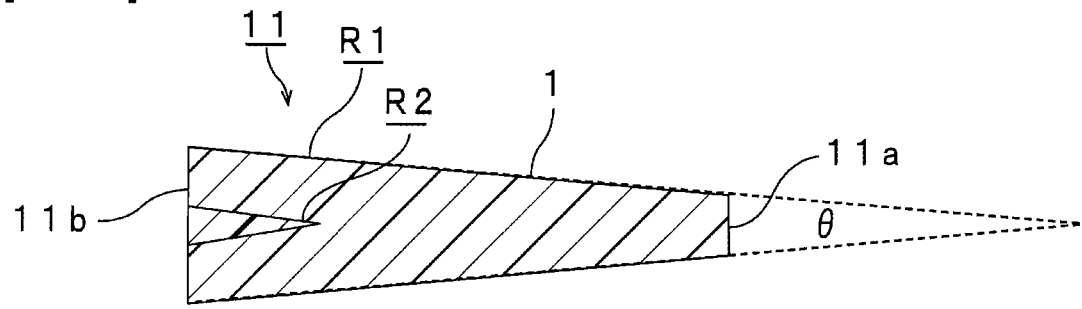
[FIG. 2]
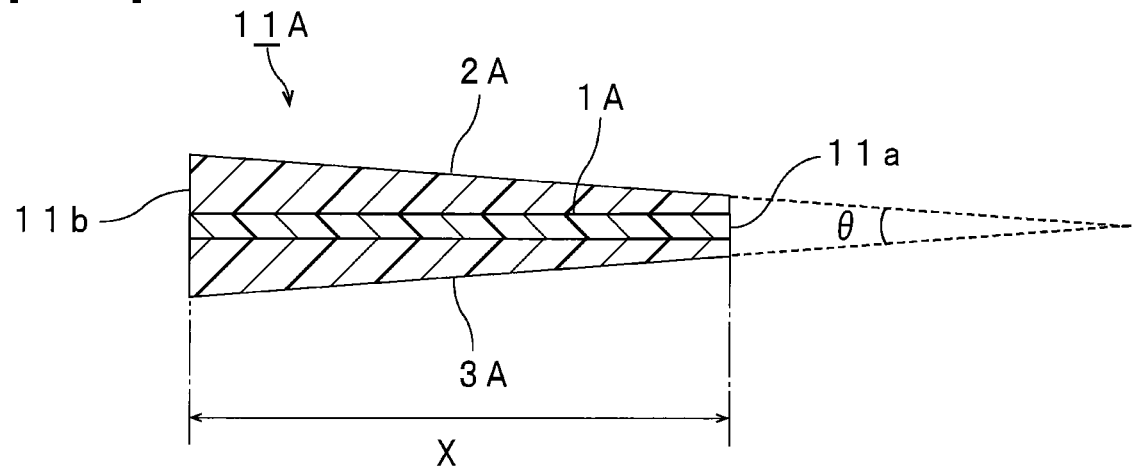
[FIG. 3]
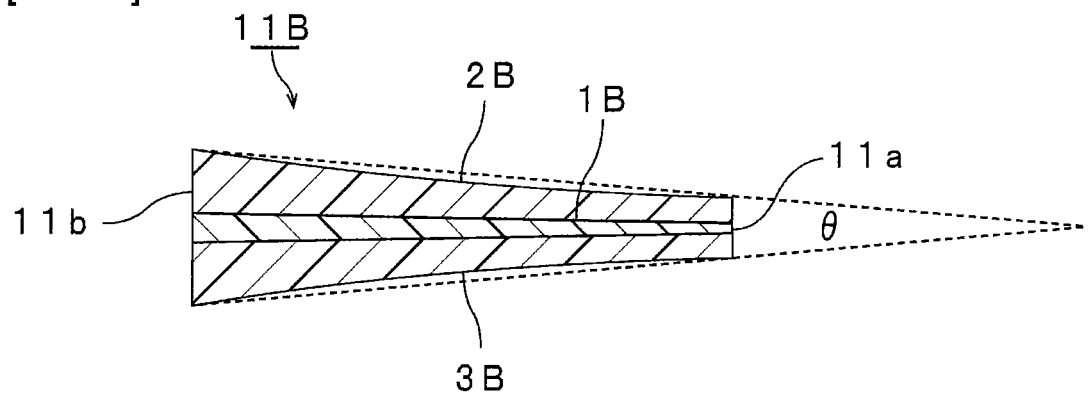
[FIG. 4]
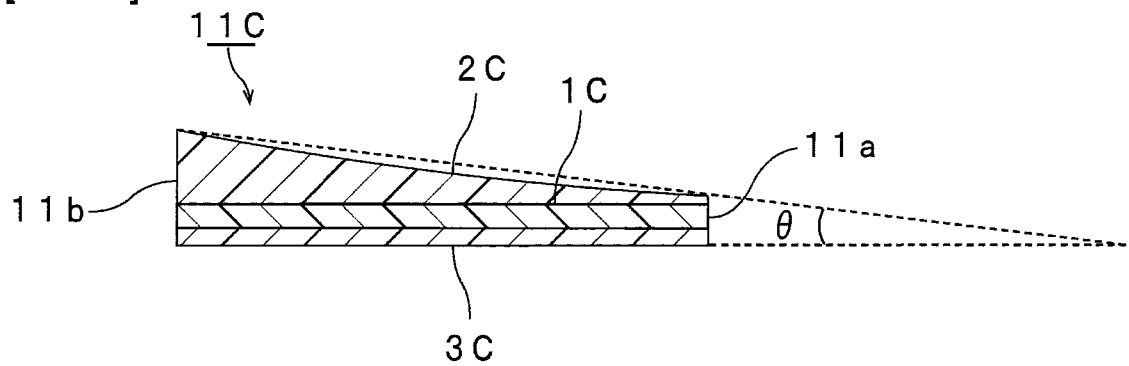

[FIG. 5]
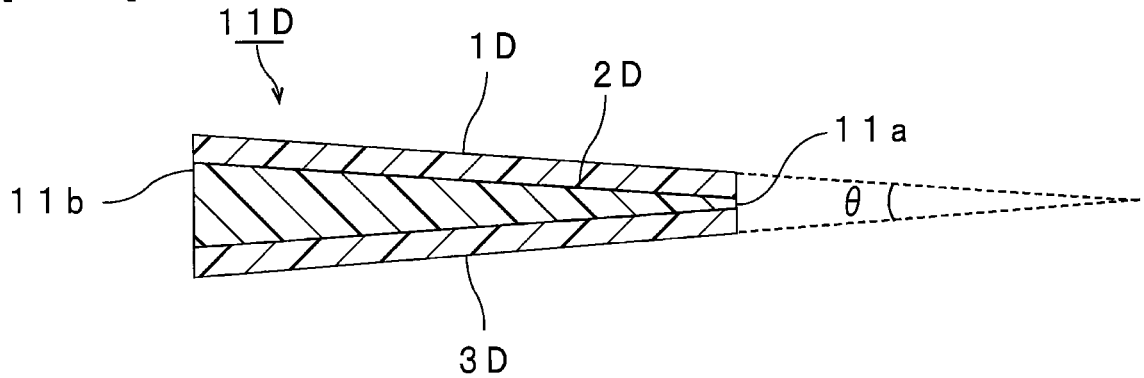
[FIG. 6]
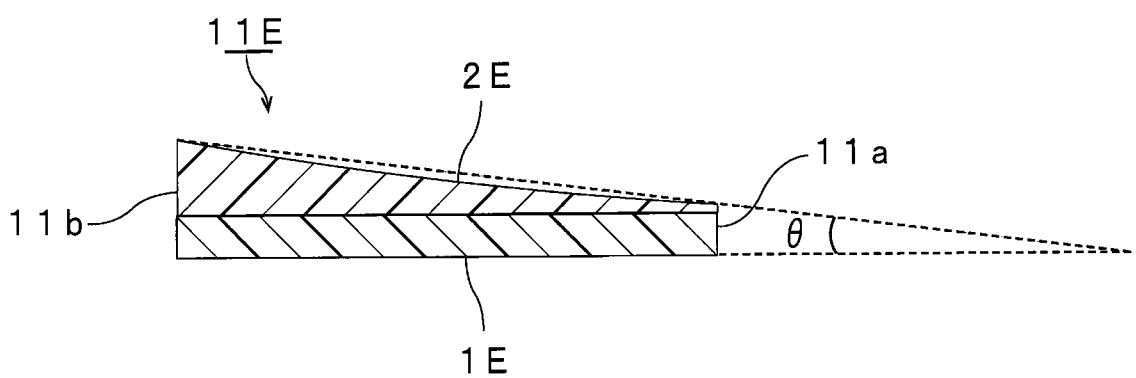
[FIG. 7]
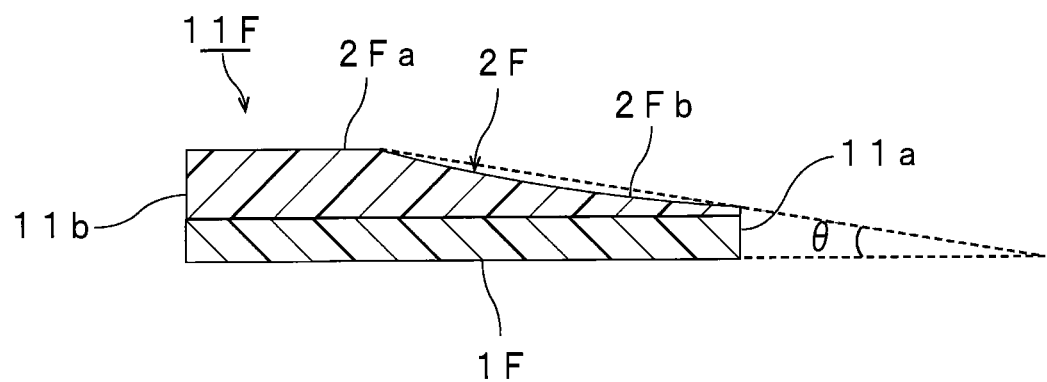

[FIG. 8]
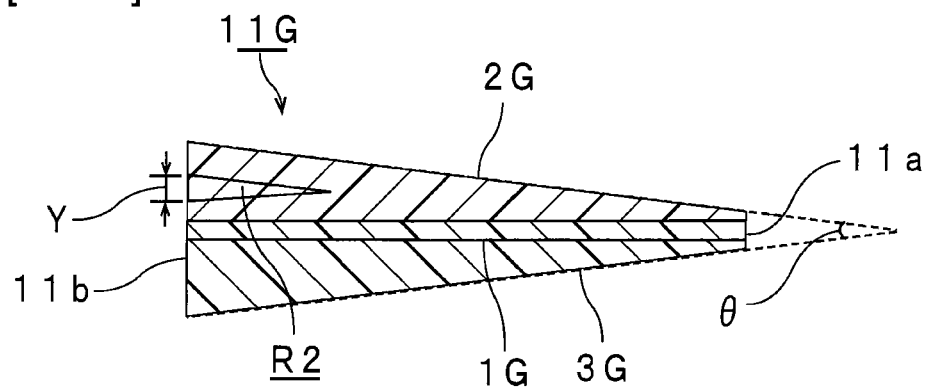
[FIG. 9]
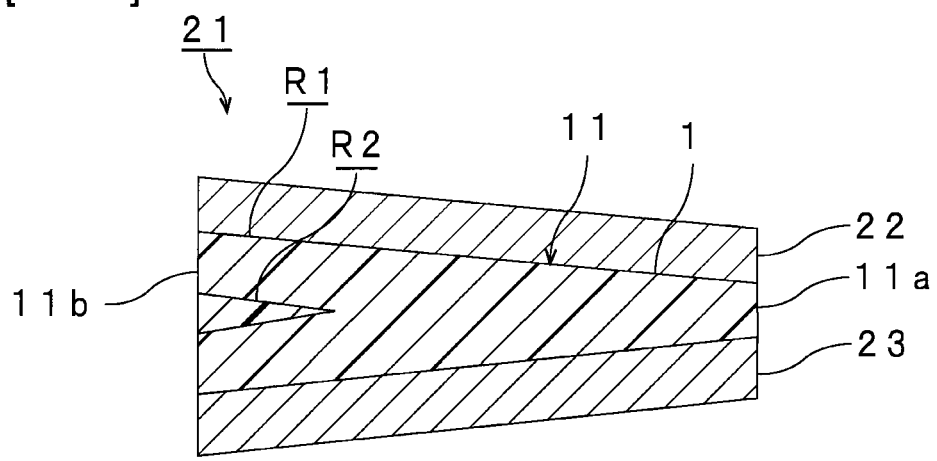

INTERLAYER FILM FOR LAMINATED GLASS AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between two glass plates.

Moreover, as the laminated glass used for automobiles, a head-up display (HUD) has been known. In the HUD, on the windshield of an automobile, measured information such as the speed which is traveling data of the automobile and the like can be displayed.

In the HUD, there is a problem that the measured information displayed on the windshield is doubly observed.

In order to suppress double images, a wedge-shaped interlayer film has been used. The following Patent Document 1 discloses a sheet of laminated glass in which a wedge-shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by the other glass plate can be focused into one point to make an image in the visual field of a driver. As such, the display of measured information is hard to be observed doubly and the visibility of a driver is not hindered.

Furthermore, the laminated glass used for opening parts of vehicles and buildings are required to have heat shielding properties.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. Accordingly, in order to heighten the heat shielding properties of laminated glass, it is necessary to sufficiently cut off infrared rays.

For the purpose of effectively cutting off the infrared rays (heat rays), the following Patent Document 2 discloses an interlayer film for laminated glass including heat shielding particles such as tin-doped indium oxide particles (ITO particles) or antimony-doped tin oxide particles (ATO particles).

The following Patent Document 3 discloses an interlayer film including tungsten oxide particles (CWO particles).

The following Patent Document 4 discloses a heat ray shielding member having two or more layers, each of which contains at least one kind among a phthalocyanine-based infrared ray absorber and an ultraviolet ray absorber. This heat ray shielding member is arranged so that a layer containing an ultraviolet ray absorber and the like is positioned closer to a side, to which heat rays are made incident, than another layer. The phthalocyanine-based infrared ray absorber corresponds to a phthalocyanine-based heat shielding compound.

RELATED ART DOCUMENTS

Patent Documents

Patent Document 1: JP H4-502525 T
Patent Document 2: WO 2001/025162 A1
Patent Document 3: WO 2005/087680 A1
Patent Document 4: JP H10-77360 A

SUMMARY OF THE INVENTION

Problems to be Solved by the Invention

In a wedge-shaped interlayer film, one end and the other end are different from each other in thickness.

As a result of researches by the present inventors, a problem that, when an interlayer film, in which one end and the other end are different from each other in thickness, is compounded with heat shielding particles such as ITO particles, ATO particles, and CWO particles, a phthalocyanine-based heat shielding compound, and the like, the visibility varies with places of a sheet of laminated glass prepared with the interlayer film has been found out. The variation in visibility varying with places of a sheet of laminated glass is hardly recognized by a driver as long as an HUD (head-up display) has a display area of a normal size. However, as the display area of an HUD is expanded, the possibility that the variation in visibility varying with places of a sheet of laminated glass is recognized by a driver is heightened. Moreover, in the future, there is a possibility that the display area of an HUD is expanded.

An object of the present invention is to provide an interlayer film for laminated glass with which the visibility can be made uniform over the whole area of laminated glass. Moreover, the present invention is also aimed at providing laminated glass prepared with the interlayer film for laminated glass.

Means for Solving the Problems

According to a broad aspect of the present invention, there is provided an interlayer film for laminated glass (in the present specification, sometimes abbreviated as "an interlayer film") containing a thermoplastic resin and a heat shielding compound and having one end and the other end being at the opposite side of the one end and having a thickness thicker than the one end, the absolute value of a difference between the thickness of a thickest portion and the thickness of a thinnest portion being 0.1 mm or more, and in a sheet of laminated glass prepared by sandwiching the interlayer film between two sheets of heat ray-absorbing plate glass with a thickness of 2.1 mm, the absolute value of a difference between the visible light transmittance at the thickest portion of the interlayer film and the visible light transmittance at the thinnest portion of the interlayer film being 4% or less.

In a specific aspect of the interlayer film according to the present invention, in a sheet of laminated glass prepared by sandwiching the interlayer film between two sheets of heat ray-absorbing plate glass with a thickness of 2.1 mm, the absolute value of a difference between the solar transmittance at the thickest portion of the interlayer film and the solar transmittance at the thinnest portion of the interlayer film is 5.5% or less.

In a specific aspect of the interlayer film according to the present invention, in the thickness direction of the thickest portion of the interlayer film, a first region and a second region having a content of the heat shielding compound smaller than the first region exist.

In a specific aspect of the interlayer film according to the present invention, the absolute value of a difference between the content of the heat shielding compound in the first region of the interlayer film and the content of the heat shielding compound in the second region of the interlayer film is 0.0001% by weight or more.

In a specific aspect of the interlayer film according to the present invention, the second region of the interlayer film contains no heat shielding compound or the second region of the interlayer film contains the heat shielding compound in an amount of 0.5% by weight or less.

In a specific aspect of the interlayer film according to the present invention, when the absolute value of a difference between the thickness of the thickest portion and the thickness of the thinnest portion is defined as X mm, X mm is more than 0.28 and the thickness of a thickest portion in the second region is (X−0.28) or more and X or less.

In a specific aspect of the interlayer film according to the present invention, the heat shielding compound is constituted of at least one kind of ingredient among a phthalocyanine compound, a naphthalocyanine compound, and an anthracyanine compound or is constituted of heat shielding particles.

In a specific aspect of the interlayer film according to the present invention, the heat shielding compound is constituted of the heat shielding particles.

In a specific aspect of the interlayer film according to the present invention, the heat shielding compound is constituted of tin-doped indium oxide particles or tungsten oxide particles as the heat shielding particles.

In a specific aspect of the interlayer film according to the present invention, the heat shielding compound is constituted of at least one kind of the ingredient among a phthalocyanine compound, a naphthalocyanine compound, and an anthracyanine compound.

In a specific aspect of the interlayer film according to the present invention, the thermoplastic resin is a polyvinyl acetal resin.

In a specific aspect of the interlayer film according to the present invention, the interlayer film contains a plasticizer.

In a specific aspect of the interlayer film according to the present invention, the interlayer film has a portion with a sectional shape in the thickness direction of a wedge-like shape.

According to a broad aspect of the present invention, there is provided laminated glass including a first lamination glass member, a second lamination glass member, and the above-described interlayer film for laminated glass, the interlayer film for laminated glass being arranged between the first lamination glass member and the second lamination glass member.

According to a broad aspect of the present invention, there is provided laminated glass including a first lamination glass member, a second lamination glass member, and an interlayer film for laminated glass, the interlayer film for laminated glass being arranged between the first lamination glass member and the second lamination glass member, the interlayer film containing a thermoplastic resin and a heat shielding compound, the interlayer film having one end and the other end being at the opposite side of the one end and having a thickness thicker than the one end, the absolute value of a difference between the thickness of a thickest portion and the thickness of a thinnest portion of the interlayer film being 0.1 mm or more, and the absolute value of a difference between the visible light transmittance at the thickest portion of the interlayer film in the laminated glass and the visible light transmittance at the thinnest portion of the interlayer film in the laminated glass being 4% or less.

Effect of the Invention

Since the interlayer film for laminated glass according to the present invention contains a thermoplastic resin and a heat shielding compound and has one end and the other end being at the opposite side of the one end and having a thickness thicker than the one end, the absolute value of a difference between the thickness of a thickest portion and the thickness of a thinnest portion is 0.1 mm or more, and in a sheet of laminated glass prepared by sandwiching the interlayer film between two sheets of heat ray-absorbing plate glass with a thickness of 2.1 mm, the absolute value of a difference between the visible light transmittance at the thickest portion of the interlayer film and the visible light transmittance at the thinnest portion of the interlayer film is 4% or less, the visibility can be made uniform over the whole area of laminated glass.

Since the laminated glass according to the present invention includes a first lamination glass member, a second lamination glass member, and an interlayer film for laminated glass, the interlayer film for laminated glass is arranged between the first lamination glass member and the second lamination glass member, the interlayer film contains a thermoplastic resin and a heat shielding compound, the interlayer film has one end and the other end being at the opposite side of the one end and having a thickness thicker than the one end, the absolute value of a difference between the thickness of a thickest portion and the thickness of a thinnest portion of the interlayer film is 0.1 mm or more, and the absolute value of a difference between the visible light transmittance at the thickest portion of the interlayer film in the laminated glass and the visible light transmittance at the thinnest portion of the interlayer film in the laminated glass is 4% or less, the visibility can be made uniform over the whole area of laminated glass.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view showing the first modified example of a sectional shape in the thickness direction of an interlayer film for laminated glass.

FIG. 4 is a sectional view showing the second modified example of a sectional shape in the thickness direction of an interlayer film for laminated glass.

FIG. 5 is a sectional view showing the third modified example of a sectional shape in the thickness direction of an interlayer film for laminated glass.

FIG. 6 is a sectional view showing the fourth modified example of a sectional shape in the thickness direction of an interlayer film for laminated glass.

FIG. 7 is a sectional view showing the fifth modified example of a sectional shape in the thickness direction of an interlayer film for laminated glass.

FIG. 8 is a sectional view schematically showing an interlayer film for laminated glass in accordance with a second embodiment of the present invention.

FIG. 9 is a sectional view showing an example of laminated glass prepared with the interlayer film for laminated glass shown in FIG. 1.

MODE(S) FOR CARRYING OUT THE INVENTION

Hereinafter, the details of the present invention will be described.

The interlayer film for laminated glass (in the present specification, sometimes abbreviated as "the interlayer film") according to the present invention contains a thermoplastic resin and a heat shielding compound.

The interlayer film according to the present invention has one end and the other end being at the opposite side of the one end and having a thickness thicker than the one end.

In the interlayer film according to the present invention, the absolute value of a difference between the thickness of a thickest portion and the thickness of a thinnest portion is 0.1 mm or more.

With regard to the interlayer film according to the present invention, in a sheet of laminated glass prepared by sandwiching the interlayer film according to the present invention between two sheets of heat ray-absorbing plate glass with a thickness of 2.1 mm, the absolute value of a difference between the visible light transmittance at the thickest portion of the interlayer film and the visible light transmittance at the thinnest portion of the interlayer film is 4% or less. In this connection, the sheet of laminated glass mentioned above is prepared to characterize an interlayer film. At the time of preparing a sheet of laminated glass with the interlayer film according to the present invention, the interlayer film may be arranged between lamination glass members other than sheets of heat ray-absorbing plate glass.

Since the interlayer film according to the present invention is provided with the above-mentioned configuration, the visibility can be made uniform over the whole area of laminated glass prepared with the interlayer film. That is, the uniformity of the visibility can be enhanced.

The laminated glass according to the present invention includes a first lamination glass member, a second lamination glass member, and an interlayer film for laminated glass. In the laminated glass according to the present invention, the interlayer film for laminated glass is arranged between the first lamination glass member and the second lamination glass member, the interlayer film contains a thermoplastic resin and a heat shielding compound, the interlayer film has one end and the other end being at the opposite side of the one end and having a thickness thicker than the one end, the absolute value of a difference between the thickness of a thickest portion and the thickness of a thinnest portion of the interlayer film is 0.1 mm or more, and the absolute value of a difference between the visible light transmittance at the thickest portion of the interlayer film in the laminated glass and the visible light transmittance at the thinnest portion of the interlayer film in the laminated glass is 4% or less.

Since the laminated glass according to the present invention is provided with the above-mentioned configuration, the visibility can be made uniform over the whole area of the laminated glass prepared with an interlayer film. That is, the uniformity of the visibility can be enhanced.

From the viewpoint of further enhancing the uniformity of the visibility, in a sheet of laminated glass prepared by sandwiching the interlayer film according to the present invention between two sheets of heat ray-absorbing plate glass with a thickness of 2.1 mm or in a sheet of the laminated glass according to the present invention, the absolute value of a difference between the visible light transmittance at the thickest portion of the interlayer film and the visible light transmittance at the thinnest portion of the interlayer film is preferably 3.5% or less and more preferably 3% or less.

From the viewpoint of enhancing the visibility, in a sheet of laminated glass prepared by sandwiching the interlayer film according to the present invention between two sheets of heat ray-absorbing plate glass with a thickness of 2.1 mm or in a sheet of the laminated glass according to the present invention, the lower visible light transmittance among the visible light transmittance at the thickest portion of the interlayer film and the visible light transmittance at the thinnest portion of the interlayer film is preferably 65% or more, more preferably 70% or more, and further preferably 73% or more.

The visible light transmittance is measured in accordance with JIS R3211 (1998).

In a sheet of laminated glass prepared by sandwiching the interlayer film according to the present invention between two sheets of heat ray-absorbing plate glass with a thickness of 2.1 mm or in a sheet of the laminated glass according to the present invention, the absolute value of a difference between the solar transmittance Ts2500 at the thickest portion of the interlayer film and the solar transmittance Ts2500 at the thinnest portion of the interlayer film is preferably 5.5% or less, more preferably 5% or less, and further preferably 4% or less. When the absolute value of a difference in the solar transmittance Ts2500 is the above upper limit or less, the heat shielding properties can be made uniform over the whole area of the laminated glass prepared with an interlayer film.

From the viewpoint of enhancing the heat shielding properties, in a sheet of laminated glass prepared by sandwiching the interlayer film according to the present invention between two sheets of heat ray-absorbing plate glass with a thickness of 2.1 mm or in a sheet of the laminated glass according to the present invention, the lower solar transmittance Ts2500 among the solar transmittance Ts2500 at the thickest portion of the interlayer film and the solar transmittance Ts2500 at the thinnest portion of the interlayer film is preferably 39% or less, more preferably 38% or less, and further preferably 37% or less.

The solar transmittance is measured in accordance with JIS R 3106 (1998).

The visible light transmittance and the solar transmittance are measured at a position described below.

When the thickest portion or the thinnest portion is apart from an end part by 25 mm or more, a square test piece of 50 mm (in a direction connecting the one end and the other end)×50 mm (in a direction orthogonal to the direction connecting the one end and the other end) is sampled so that the thickest portion or the thinnest portion is positioned at the center.

When the thickest portion or the thinnest portion is not apart from an end part by 25 mm or more, a square test piece of 50 mm (in a direction connecting the one end and the other end)×50 mm (in a direction orthogonal to the direction connecting the one end and the other end) is sampled so that the end part constitutes a side of the test piece.

Moreover, when a segment in which the interlayer film has the thinnest film thickness extends by a constant distance in a direction connecting the one end and the other end of the interlayer film, an end part at the one end side of the segment is defined as the thinnest portion to sample a test piece. When a segment in which the interlayer film has the thickest film thickness extends by a constant distance in a direction connecting the one end and the other end of the interlayer film (for example, see FIG. 7), an end part at the other end side of the segment is defined as the thickest portion to sample a test piece.

From the viewpoints of further enhancing the uniformity of the visibility and further enhancing the uniformity of the heat shielding properties, it is preferred that, in the thickness direction of the thickest portion of the interlayer film, a first region and a second region having a content of the heat shielding compound smaller than the first region exist.

From the viewpoints of further enhancing the uniformity of the visibility and further enhancing the uniformity of the heat shielding properties, the absolute value of a difference between the content of the heat shielding compound in the first region of the interlayer film and the content of the heat shielding compound in the second region of the interlayer film is preferably 0.0001% by weight or more and more preferably 0.0005% by weight or more. The absolute value of a difference between the content of the heat shielding compound in the first region of the interlayer film and the content of the heat shielding compound in the second region of the interlayer film is preferably 0.5% by weight or less and more preferably 0.4% by weight or less.

From the viewpoints of further enhancing the uniformity of the visibility and further enhancing the uniformity of the heat shielding properties, it is preferred that the second region of the interlayer film contain no heat shielding compound or the second region of the interlayer film contain the heat shielding compound in an amount of 0.2% by weight or less. From the viewpoints of further enhancing the uniformity of the visibility and further enhancing the uniformity of the heat shielding properties, the content of the heat shielding compound in the second region of the interlayer film is more preferably 0.15% by weight or less.

The absolute value of a difference between the thickness of the thickest portion and the thickness of the thinnest portion is defined as X mm. From the viewpoints of further enhancing the uniformity of the visibility and further enhancing the uniformity of the heat shielding properties, the thickness Y mm of a thickest portion in the second region is preferably (X−0.28) or more, more preferably (X−0.25) or more, and preferably X or less, and more preferably (X−0.05) or less.

Hereinafter, specific embodiments of the present invention will be described with reference to the drawings.

FIG. 1 is a sectional view schematically showing an interlayer film for laminated glass in accordance with a first embodiment of the present invention.

In FIG. 1, a section in the thickness direction of an interlayer film 11 is shown. In this connection, in FIG. 1 and a figure described below, for convenience of illustration, the thicknesses of an interlayer film and respective layers constituting the interlayer film and the wedge angle θ are shown so as to be different from actual thicknesses thereof and an actual wedge angle.

The interlayer film 11 shown in FIG. 1 is provided with a first layer 1. The interlayer film 11 has a one-layer structure composed only of the first layer 1 and is a single-layered interlayer film. The interlayer film 11 is singly constituted by the first layer 1. The interlayer film 11 is used for obtaining laminated glass. The interlayer film 11 is an interlayer film for laminated glass.

The sectional shape in the thickness direction of the first layer 1 corresponding to the interlayer film 11 is a wedge-like shape. The interlayer film 11 has one end 11a and the other end 11b at the opposite side of the one end 11a. The one end 11a and the other end 11b are end parts of both sides facing each other. The thickness of the one end 11a of the interlayer film 11 is thinner than the thickness of the other end 11b thereof. Accordingly, the interlayer film 11 and first layer 1 have a region being thin in thickness and a region being thick in thickness.

In the interlayer film 11, a second region R2 containing no heat shielding compound exists at the other end 11b side being thick in thickness. Two portions of a first region R1 containing a heat shielding compound exist respectively at both sides of the second region R2 in the thickness direction of the interlayer film. The second region R2 in the interlayer film 11 may contain a heat shielding compound.

It is preferred that the second region R2 have one end (corresponding to the one end side of the interlayer film) with a thickness thinner than the thickness of the other end (corresponding to the other end side of the interlayer film) and be a region having a sectional shape in the thickness direction of a wedge-like shape. On this occasion, it is preferred that the direction from one end 11a to the other end 11b of the interlayer film 11 and the direction from one end to the other end of the second region R2 be aligned with each other.

It is preferred that the second region R2 be positioned between 0.5Z to Z when the distance from the one end 11a to the other end 11b of the interlayer film 11 is defined as Z and the one end and the other end are set to 0Z and Z respectively.

FIG. 2 is a sectional view schematically showing an interlayer film for laminated glass in accordance with a second embodiment of the present invention.

The interlayer film 11A shown in FIG. 2 is provided with a first layer 1A (intermediate layer), a second layer 2A (surface layer), and a third layer 3A (surface layer). The second layer 2A is arranged on a first surface side of the first layer 1A to be layered thereon. The third layer 3A is arranged on a second surface side opposite to the first surface of the first layer 1A to be layered thereon. The first layer 1A is arranged between the second layer 2A and the third layer 3A to be sandwiched therebetween. The interlayer film 11A is used for obtaining laminated glass. The interlayer film 11A is an interlayer film for laminated glass. The interlayer film 11A is a multilayer interlayer film. A lamination glass member is layered on the surface layer.

The interlayer film 11A has one end 11a and the other end 11b at the opposite side of the one end 11a. The one end 11a and the other end 11b are end parts of both sides facing each other. The sectional shape in the thickness direction of each of the second layer 2A and the third layer 3A is a wedge-like shape. The sectional shape in the thickness direction of the first layer 1A is a rectangular shape. The thickness of the one end 11a side of each of the second layer 2A and the third layer 3A is thinner than that of the other end 11b side thereof. Accordingly, the thickness of the one end 11a of the interlayer film 11A is thinner than the thickness of the other end 11b thereof. Accordingly, the interlayer film 11A has a region being thin in thickness and a region being thick in thickness.

The difference between the maximum thickness and the minimum thickness in the first layer 1A is smaller than the difference between the maximum thickness and the minimum thickness in the second layer 2A. The difference between the maximum thickness and the minimum thickness in the first layer 1A is smaller than the difference between the maximum thickness and the minimum thickness in the third layer 3A.

Although the following are not particularly limited in the interlayer film 11A, for example, a first layer 1A which is compounded with a heat shielding compound and a second layer 2A and a third layer 3A which are compounded with no heat shielding compound can be adopted. Moreover, a second layer 2A and a third layer 3A which are compounded with a heat shielding compound and a first layer 1A which is compounded with no heat shielding compound can also be adopted. Like such an interlayer film 11A, each of the respective layers may correspond to a first region or a second region having a content of the heat shielding compound smaller than the first region.

The interlayer film 11A shown in FIG. 2 has a structure in which the rectangular-shaped first layer 1A is sandwiched between the wedge-shaped second layer 2A and the wedge-shaped third layer 3A. In FIGS. 3 to 7, the first to fifth modified examples in which the interlayer film is changed in the shape of each layer are shown.

An interlayer film 11B in accordance with the first modified example shown in FIG. 3 is provided with a first layer 1B having a sectional shape in the thickness direction of a wedge-like shape, a second layer 2B having a sectional shape in the thickness direction of a wedge-like shape, and a third layer 3B having a sectional shape in the thickness direction of a wedge-like shape. The first layer 1B is arranged between the second layer 2B and the third layer 3B to be sandwiched therebetween.

The thickness of one end 11a side of each of the first layer 1B, the second layer 2B, and the third layer 3B is thinner than that of the other end 11b side thereof. Accordingly, the interlayer film 11B has a region being thin in thickness and a region being thick in thickness.

In the interlayer film 11B, the amount of change in the thickness of the first layer 1B is smaller than the amount of change in the thickness of each of the second layer 2B and the third layer 3B.

Although the following are not particularly limited in the interlayer film 11B, for example, a first layer 1B which is compounded with a heat shielding compound and a second layer 2B and a third layer 3B which are compounded with no heat shielding compound can be adopted.

An interlayer film 11C in accordance with the second modified example shown in FIG. 4 is provided with a first layer 1C having a sectional shape in the thickness direction of a rectangular shape, a second layer 2C having a sectional shape in the thickness direction of a wedge-like shape, and a third layer 3C having a sectional shape in the thickness direction of a rectangular shape. The first layer 1C is arranged between the second layer 2C and the third layer 3C to be sandwiched therebetween. The thickness of one end 11a side of the second layer 2C is thinner than that of the other end 11b side thereof. Accordingly, the interlayer film 11C has a region being thin in thickness and a region being thick in thickness. A single-layered interlayer film having the same shape as the interlayer film 11C may be adopted.

An interlayer film 11D in accordance with the third modified example shown in FIG. 5 is provided with a first layer 1D having a sectional shape in the thickness direction of a rectangular shape, a second layer 2D having a sectional shape in the thickness direction of a wedge-like shape, and a third layer 3D having a sectional shape in the thickness direction of a rectangular shape. The second layer 2D is arranged between the first layer 1D and the third layer 3D to be sandwiched therebetween. The thickness of one end 11a side of the second layer 2D is thinner than that of the other end 11b side thereof. Accordingly, the interlayer film 11D has a region being thin in thickness and a region being thick in thickness.

Although the following are not particularly limited in the interlayer film 11D, for example, a second layer 2D and a third layer 3D which are compounded with a heat shielding compound and a first layer 1D which is compounded with no heat shielding compound can be adopted. Moreover, a first layer 1D which is compounded with a heat shielding compound and a second layer 2D and a third layer 3D which are compounded with no heat shielding compound can also be adopted.

An interlayer film 11E in accordance with the fourth modified example shown in FIG. 6 is provided with a first layer 1E having a sectional shape in the thickness direction of a rectangular shape and a second layer 2E having a sectional shape in the thickness direction of a wedge-like shape. The second layer 2E is arranged on a first surface side of the first layer 1E to be layered thereon. The thickness of one end 11a side of the second layer 2E is thinner than that of the other end 11b side thereof. Accordingly, the interlayer film 11E has a region being thin in thickness and a region being thick in thickness.

An interlayer film 11F in accordance with the fifth modified example shown in FIG. 7 is provided with a first layer 1F having a sectional shape in the thickness direction of a rectangular shape and a second layer 2F having a portion 2Fa with a sectional shape in the thickness direction of a rectangular shape and a portion 2Fb with a sectional shape in the thickness direction of a wedge-like shape. The second layer 2F is arranged on a first surface side of the first layer 1F to be layered thereon. The thickness of one end 11a side of the second layer 2F is thinner than that of the other end 11b side thereof. Accordingly, the interlayer film 11F has a region being thin in thickness and a region being thick in thickness. A single-layered interlayer film having the same shape as the interlayer film 11F may be adopted.

It is preferred that the interlayer film have a portion with a sectional shape in the thickness direction of a wedge-like shape. It is preferred that the interlayer film have a portion where the thickness is gradually increased from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

FIG. 8 is a sectional view schematically showing an interlayer film for laminated glass in accordance with a second embodiment of the present invention.

An interlayer film 11G shown in FIG. 8 is provided with a first layer 1G having a sectional shape in the thickness direction of a rectangular shape, a second layer 2G having a sectional shape in the thickness direction of a wedge-like shape, and a third layer GD having a sectional shape in the thickness direction of a rectangular shape. The second layer 2G is arranged between the first layer 1G and the third layer 3G to be sandwiched therebetween. The thickness of one end 11a side of the second layer 2G is thinner than that of the other end 11b side thereof. Accordingly, the interlayer film 11G has a region being thin in thickness and a region being thick in thickness. The interlayer film 11G has a second region R2 in the second layer 2G.

In order to suppress double images, the wedge angle θ of the interlayer film can be appropriately set according to the fitting angle of laminated glass. From the viewpoint of further suppressing double images, the wedge angle θ of the interlayer film is preferably 0.01 mrad (0.0006 degrees) or more, more preferably 0.2 mrad (0.0115 degrees) or more, and preferably 2 mrad (0.1146 degrees) or less, and more preferably 0.7 mrad (0.0401 degrees) or less. The wedge angle θ of an interlayer film is an interior angle formed at the intersection point between a straight line connecting a point on the first surface of the maximum thickness part of the interlayer film and a point on the first surface of the minimum thickness part thereof and a straight line connecting a point on the second surface of the maximum thickness part of the interlayer film and a point on the second surface of the minimum thickness part thereof.

The interlayer film may have a colored band area in a partial region. The interlayer film may have a colored region in a partial region. When a multi-layered interlayer film has a colored band area or a colored region, it is preferred that a surface layer have a colored band area or a colored region. However, an intermediate layer may have a colored band area or a colored region. For example, at the time of extrusion-molding an interlayer film or at the time of extrusion-molding the respective layers of the interlayer film, a prescribed region can be compounded with a coloring agent to form the colored band area or the colored region.

The thickness of the interlayer film is not particularly limited. The thickness of the interlayer film refers to the total thickness of the respective layers constituting the interlayer film. Thus, in the case of a multi-layered interlayer film 11A, the thickness of the interlayer film 11A refers to the total thickness of the first layer 1A, the second layer 2A, and the third layer 3A.

The maximum thickness of the interlayer film is preferably 0.1 mm or more, more preferably 0.25 mm or more, further preferably 0.5 mm or more, especially preferably 0.8 mm or more, and preferably 3 mm or less, more preferably 2 mm, and further preferably 1.5 mm or less.

When the distance between one end and the other end is defined as Z, it is preferred that the interlayer film have a minimum thickness in a region within a distance of 0Z to 0.2Z from the one end toward the inside and have a maximum thickness in a region within a distance of 0Z to 0.2Z from the other end toward the inside, and it is more preferred that the interlayer film have a minimum thickness in a region within a distance of 0X to 0.1X from the one end toward the inside and have a maximum thickness in a region within a distance of 0Z to 0.1Z from the other end toward the inside. It is preferred that one end of the interlayer film have a minimum thickness and the other end of the interlayer film have a maximum thickness.

In the interlayer films 11, 11A, 11B, 11C, 11D, 11E, 11F, and 1G, the one end 11a has a minimum thickness and the other end 11b has a maximum thickness.

From the viewpoint of the practical aspect and the viewpoint of sufficiently heightening the adhesive force and the penetration resistance, the maximum thickness of a surface layer is preferably 0.001 mm or more, more preferably 0.2 mm or more, further preferably 0.3 mm or more, and preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, further preferably 0.2 mm or more, and preferably 0.8 mm or less, more preferably 0.6 mm or less, and further preferably 0.3 mm or less.

The distance Z between one end and the other end of the interlayer film is preferably 3 m or less, more preferably 2 m or less, and especially preferably 1.5 m or less and is preferably 0.5 m or more, more preferably 0.8 m or more, and especially preferably 1 m or more.

The interlayer film according to the present invention has a one-layer structure or a two or more-layer structure. The interlayer film according to the present invention may have a one-layer structure, may have a two or more-layer structure, and may have a three or more-layer structure. The interlayer film according to the present invention is provided with a first layer. The interlayer film according to the present invention may be a single-layered interlayer film provided with only a first layer and may be a multi-layered interlayer film provided with a first layer and another layer.

The interlayer film may have a two or more-layer structure and may be provided with a second layer in addition to a first layer. It is preferred that the interlayer film be provided with the second layer as a surface layer of the interlayer film. When the interlayer film is provided with the second layer, the second layer is arranged on a first surface side of the first layer. In this case, the second layer may be directly layered on the first layer and an additional layer may be arranged between the first layer and the second layer.

The interlayer film may have a three or more-layer structure and may be provided with a third layer in addition to a first layer and a second layer. It is preferred that the interlayer film be provided with the third layer as a surface layer of the interlayer film. When the interlayer film is provided with the third layer, the third layer is arranged on a second surface side opposite to the first surface of the first layer. When the interlayer film is provided with the third layer, the first layer is arranged between the second layer and the third layer. In this case, the third layer may be directly layered on the first layer and an additional layer may be arranged between the first layer and the third layer.

Hereinafter, the details of materials constituting the respective layers of a multi-layered interlayer film and the single-layered interlayer film will be described.

(Polyvinyl Acetal Resin or Thermoplastic Resin)

It is preferred that the interlayer film contain a thermoplastic resin and it is preferred that the interlayer film contain a polyvinyl acetal resin as the thermoplastic resin. It is preferred that the first layer (including a single-layered interlayer film) contain a thermoplastic resin (hereinafter, sometimes described as a thermoplastic resin (1)) and it is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)) and it is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)) and it is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same as or different from one another. One kind of each of the thermoplastic resin (1), the thermoplastic resin (2), and the thermoplastic resin (3) may be used alone and two or more kinds thereof may be used in combination.

The polyvinyl acetal resin (1), the polyvinyl acetal resin (2), and the polyvinyl acetal resin (3) may be the same as or different from one another. One kind of each of the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film for laminated glass according to the present invention to a lamination glass member or another interlayer film is further heightened.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol is generally 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, and preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone and two or more kinds thereof may be used in combination.

The content of the hydroxyl group (the amount of hydroxyl groups) of the polyvinyl acetal resin (1) is preferably 17% by mole or more, more preferably 20% by mole or more, further preferably 22% by mole or more, and preferably 35% by mole or less, more preferably 30% by mole or less, further preferably less than 27% by mole, and especially preferably 25% by mole or less. When the content of the hydroxyl group is the above lower limit or more, the adhesive force of the interlayer film is further heightened. In particular, when the content of the hydroxyl group of the polyvinyl acetal resin (1) is 20% by mole or more, the resin is high in reaction efficiency and is excellent in productivity, and moreover, when being less than 27% by mole, the sound insulating properties of laminated glass are further heightened. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, and preferably 35% by mole or less, and more preferably 32% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further heightening the sound insulating properties, it is preferred that the content of the hydroxyl group of the polyvinyl acetal resin (1) be lower than the content of the hydroxyl group of the polyvinyl acetal resin (3). From the viewpoint of still further heightening the sound insulating properties, each of the absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, and most preferably 12% by mole or more. Each of the absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more, and preferably 30% by mole or less, more preferably 25% by mole or less, and further preferably 15% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and 25% by mole or less, the resulting laminated glass is excellent in penetration resistance.

The acetylation degree of each of the polyvinyl acetal resin (2) and the polyvinyl acetal resin (3) is preferably 0.01% by mole or more, more preferably 0.5% by mole or more, and preferably 10% by mole or less, and more preferably 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more, more preferably 60% by mole or more, and preferably 80% by mole or less, and more preferably 70% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, more preferably 67% by mole or more, and preferably 75% by mole or less, and more preferably 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (1) be a polyvinyl acetal resin (A) with an acetylation degree (a) of 8% by mole or less and an acetalization degree (a) of 66% by mole or more or a polyvinyl acetal resin (B) with an acetylation degree (b) of more than 8% by mole. The polyvinyl acetal resin (1) may be the polyvinyl acetal resin (A) and may be the polyvinyl acetal resin (B).

The acetylation degree (a) of the polyvinyl acetal resin (A) is 8% by mole or less, preferably 7.5% by mole or less, more preferably 7% by mole or less, further preferably 6.5% by mole or less, especially preferably 5% by mole or less, and preferably 0.1% by mole or more, more preferably 0.5% by mole or more, further preferably 0.8% by mole or more, and especially preferably 1% by mole or more. When the acetylation degree (a) is the above upper limit or less and the above lower limit or more, the transfer of a plasticizer can be easily controlled and the sound insulating properties of laminated glass are further heightened.

The acetalization degree (a) of the polyvinyl acetal resin (A) is 66% by mole or more, preferably 67.5% by mole or more, more preferably 70.5% by mole or more, especially preferably 71% by mole or more, further preferably 71.5% by mole or more, especially preferably 72% by mole or more, and preferably 85% by mole or less, more preferably 83% by mole or less, further preferably 81% by mole or less, and especially preferably 79% by mole or less. When the acetalization degree (a) is the above lower limit or more, the sound insulating properties of laminated glass are further heightened. When the acetalization degree (a) is the above upper limit or less, the reaction time required for producing the polyvinyl acetal resin (A) can be shortened.

The content (a) of the hydroxyl group of the polyvinyl acetal resin (A) is preferably 18% by mole or more, more preferably 19% by mole or more, further preferably 20% by mole or more, especially preferably 21% by mole or more, and preferably 31% by mole or less, more preferably 30% by mole or less, further preferably 29% by mole or less, and especially preferably 28% by mole or less. When the content (a) of the hydroxyl group is the above lower limit or more, the adhesive force of the first layer is further heightened. When the content (a) of the hydroxyl group is the above upper limit or less, the sound insulating properties of laminated glass are further heightened.

The acetylation degree (b) of the polyvinyl acetal resin (B) is more than 8% by mole, preferably 9% by mole or more, more preferably 9.5% by mole or more, further preferably 10% by mole or more, especially preferably 10.5% by mole or more, and preferably 30% by mole or less, more preferably 28% by mole or less, further preferably 26% by mole or less, and especially preferably 24% by mole or less. When the acetylation degree (b) is the above lower limit or more, the sound insulating properties of laminated glass are further heightened. When the acetylation degree (b) is the above upper limit or less, the reaction time required for producing the polyvinyl acetal resin (B) can be shortened.

The acetalization degree (b) of the polyvinyl acetal resin (B) is preferably 50% by mole or more, more preferably 53% by mole or more, further preferably 55% by mole or more, especially preferably 60% by mole or more, and preferably 80% by mole or less, more preferably 78% by mole or less, further preferably 76% by mole or less, and especially preferably 74% by mole or less. When the acetalization degree (b) is the above lower limit or more, the sound insulating properties of laminated glass are further heightened. When the acetalization degree (b) is the above upper limit or less, the reaction time required for producing the polyvinyl acetal resin (B) can be shortened.

The content (b) of the hydroxyl group of the polyvinyl acetal resin (B) is preferably 18% by mole or more, more preferably 19% by mole or more, further preferably 20% by mole or more, especially preferably 21% by mole or more, and preferably 31% by mole or less, more preferably 30% by mole or less, further preferably 29% by mole or less, and especially preferably 28% by mole or less. When the content (b) of the hydroxyl group is the above lower limit or more, the adhesive force of the first layer is further heightened. When the content (b) of the hydroxyl group is the above upper limit or less, the sound insulating properties of laminated glass are further heightened.

It is preferred that each of the polyvinyl acetal resin (A) and the polyvinyl acetal resin (B) be a polyvinyl butyral resin.

(Plasticizer)

It is preferred that the interlayer film contain a plasticizer. It is preferred that the first layer (including a single-layered interlayer film) contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By using a polyvinyl acetal resin and a plasticizer together, the adhesive force of a layer containing the polyvinyl acetal resin and the plasticizer to a lamination glass member or another layer is moderately heightened. The plasticizer is not particularly limited. The plasticizer (1), the plasticizer (2), and the plasticizer (3) may be the same as or different from one another. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

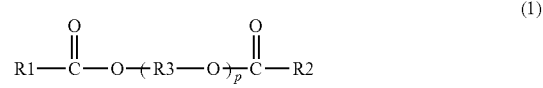

In the foregoing formula (1), R1 and R2 each represent an organic group with 2 to 10 carbon atoms, R3 represents an ethylene group, an isopropylene group, or an n-propylene group, and p represents an integer of 3 to 10. It is preferred that R1 and R2 in the foregoing formula (1) each be an organic group with 5 to 10 carbon atoms and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH), or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

The content of the plasticizer (1) (hereinafter, sometimes described as the content (1)) relative to 100 parts by weight of the thermoplastic resin (1) (100 parts by weight a polyvinyl acetal resin (1) when the thermoplastic resin (1) is the polyvinyl acetal resin (1)) is preferably 35 parts by weight or more, more preferably 50 parts by weight or more, further preferably 55 parts by weight or more, especially preferably 60 parts by weight or more, and preferably 100 parts by weight or less, more preferably 90 parts by weight or less, further preferably 85 parts by weight or less, and especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

Each of the content of the plasticizer (2) (hereinafter, sometimes described as the content (2)) relative to 100 parts by weight of the thermoplastic resin (2) (100 parts by weight a polyvinyl acetal resin (2) when the thermoplastic resin (2) is the polyvinyl acetal resin (2)) and the content of the plasticizer (3) (hereinafter, sometimes described as the content (3)) relative to 100 parts by weight of the thermoplastic resin (3) (100 parts by weight a polyvinyl acetal resin (3) when the thermoplastic resin (3) is the polyvinyl acetal resin (3)) is preferably 10 parts by weight or more, more preferably 15 parts by weight or more, and preferably 45 parts by weight or less, more preferably 40 parts by weight or less, further preferably 35 parts by weight or less, and especially preferably 32 parts by weight or less. When the content (2) and the content (3) are the above lower limit or more, the flexibility of the interlayer film is enhanced and the handling of the interlayer film is facilitated. When the content (2) and the content (3) are the above upper limit or less, the flexural rigidity is further enhanced.

For the purpose of heightening the sound insulating properties of laminated glass, it is preferred that the content (1) be larger than the content (2) and it is preferred that the content (1) be larger than the content (3).

From the viewpoint of further heightening the sound insulating properties of laminated glass, each of the absolute value of a difference between the content (2) and the content (1) and the absolute value of a difference between the content (3) and the content (1) is preferably 10 parts by weight or more, more preferably 15 parts by weight or more, and further preferably 20 parts by weight or more. Each of the absolute value of a difference between the content (2) and the content (1) and the absolute value of a difference between the content (3) and the content (1) is preferably 80 parts by weight or less, more preferably 75 parts by weight or less, and further preferably 70 parts by weight or less.

(Heat Shielding Compound)

The interlayer film contains a heat shielding compound. It is preferred that the first layer contain a heat shielding compound. It is preferred that the second layer contain a heat shielding compound. It is preferred that the third layer contain a heat shielding compound. One kind of the heat shielding compound may be used alone and two or more kinds thereof may be used in combination.

It is preferred that the heat shielding compound be constituted of at least one kind of Ingredient X among a phthalocyanine compound, a naphthalocyanine compound, and an anthracyanine compound or be constituted of heat shielding particles. In this case, the heat shielding compound may be constituted of both of the Ingredient X and the heat shielding particles.

In 100% by weight of the whole region containing the heat shielding compound (the region excluding a region containing no heat shielding compound), the content of the heat shielding compound is preferably 0.0001% by weight or more, more preferably 0.05% by weight or more, further preferably 0.1% by weight or more, and preferably 0.5% by weight or less, more preferably 0.4% by weight or less, and further preferably 0.35% by weight or less. When the content of the heat shielding compound is the above lower limit or more and the above upper limit or less, the heat shielding properties are sufficiently enhanced and the visible light transmittance is sufficiently heightened. For example, it is possible to make the visible light transmittance 70% or more.

Ingredient X:

It is preferred that the interlayer film contain at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. It is preferred that the first region contain the Ingredient X. The second region may contain the Ingredient X. The Ingredient X is a heat shielding compound. One kind of the Ingredient X may be used alone and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the whole region containing the Ingredient X (the region excluding a region containing no Ingredient X), the content of the Ingredient X is preferably 0.001% by weight or more, more preferably 0.005% by weight or more, further preferably 0.01% by weight or more, especially preferably 0.02% by weight or more, and preferably 0.2% by weight or less, more preferably 0.1% by weight or less, further preferably 0.05% by weight or less, and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. It is preferred that the first region contain the heat shielding particles. The second region may contain the heat shielding particles. The heat shielding particle is of a heat shielding compound. By the use of heat shielding particles, infrared rays (heat rays) can be effectively cut off. One kind of the heat shielding particles may be used alone and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film, the tungsten oxide particles represented by the following formula (X1) or the following formula (X2) are suitably used.

$$W_yO_z \quad \text{Formula (X1)}$$

In the foregoing formula (X1), W represents tungsten, O represents oxygen, and y and z satisfy the equation of $2.0<z/y<3.0$.

$$M_xW_yO_z \quad \text{Formula (X2)}$$

In the foregoing formula (X2), M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re, W represents tungsten, O represents oxygen, and x, y and z satisfy the equations of $0.001 \leq x/y \leq 1$ and $2.0<z/y \leq 3.0$.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and preferably 0.1 μm or less and more preferably 0.05 μm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the whole region containing the heat shielding particles (the region excluding a region containing no heat shielding particles), the content of the heat shielding particles in respective regions is preferably 0.01% by weight or more, more preferably 0.1% by weight or more, further preferably 1% by weight or more, especially preferably 1.5% by weight or more, and preferably 6% by weight or less, more preferably 5.5% by weight or less, further preferably 4% by weight or less, especially preferably 3.5% by weight or less, and most preferably 3.0% by weight or less. When the content of the heat shielding particles is the above lower limit or more and the above upper limit or less, the heat shielding properties are sufficiently enhanced and the visible light transmittance is sufficiently heightened.

It is preferred that a layer containing the heat shielding particles (a first layer, a second layer, or a third layer) contain the heat shielding particles in a proportion of 0.1 $g/m^2$ or more and 12 $g/m^2$ or less. When the proportion of the heat shielding particles lies within the above-mentioned range, the heat shielding properties are sufficiently enhanced and the visible light transmittance is sufficiently heightened. The proportion of the heat shielding particles is preferably 0.5 $g/m^2$ or more, more preferably 0.8 $g/m^2$ or more, further preferably 1.5 $g/m^2$ or more, especially preferably 3 $g/m^2$ or more, and preferably 11 $g/m^2$ or less, more preferably 10 $g/m^2$ or less, further preferably 9 $g/m^2$ or less, and especially preferably 7 $g/m^2$ or less. When the proportion is the above lower limit or more, the heat shielding properties are further enhanced. When the proportion is the above upper limit or less, the visible light transmittance is further heightened.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone and two or more kinds thereof may be used in combination.

It is preferred that the Metal salt M contain at least one kind of metal selected from the group consisting of Li, Na, K, Rb, Cs, Mg, Ca, Sr, and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer, or a third layer) is preferably 5 ppm or more, more preferably 10 ppm or more, further preferably 20 ppm or more, and preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer, or a third layer), the content of the ultraviolet ray screening agent is preferably 0.1% by weight or more, more preferably 0.2% by weight or more, further preferably 0.3% by weight or more, especially preferably 0.5% by weight or more, and preferably 2.5% by weight or less, more preferably 2% by weight or less, further preferably 1% by weight or less, and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3, 5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer, and the third layer may contain additives such as a coupling agent, a dispersing agent, a surfactant, a flame retardant, an antistatic agent, a pigment, a dye, an adhesive force regulating agent other than a metal salt, a moisture-resistance improving agent, a fluorescent brightening agent, and an infrared ray absorber, as necessary. One kind of these additives may be used alone and two or more kinds thereof may be used in combination.

(Laminated Glass)

FIG. 9 is a sectional view showing an example of laminated glass prepared with the interlayer film for laminated glass shown in FIG. 1.

The laminated glass 21 shown in FIG. 9 is provided with an interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate and it is preferred that at least one glass plate be used. It is preferred that each of the first lamination glass member and the second lamination glass member be a glass plate or a PET (polyethylene terephthalate) film and the interlayer film include at least one glass plate as the first lamination glass member or the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the sheet of organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and preferably 5 mm or less. When the lamination glass member is a PET film, the thickness of the PET film is preferably 0.03 mm or more and preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag. Therefore, the air remaining between the first lamination glass member and the interlayer film and between the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings, and the like. It is preferred that the laminated glass be laminated glass for building or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

Since laminated glass prepared with the interlayer film enables double images to be suppressed, the laminated glass can be suitably used for a windshield of an automobile. It is preferred that the interlayer film be used for laminated glass constituting a head-up display (HUD). It is preferred that the laminated glass constitute a head-up display (HUD).

In the laminated glass, measured information such as the speed which is sent from a control unit and the like can be emitted from a display unit of the instrumental panel to be projected onto the windshield. As such, without making a driver of an automobile move his or her visual field downward, a front visual field and measured information can be visually observed simultaneously.

Hereinafter, the present invention will be described in more detail with reference to examples. The present invention is not limited only to these examples.

The following materials were prepared.

(Thermoplastic Resin)

PVB1 (Polyvinyl acetal resin: a polyvinyl butyral resin acetalized with n-butyraldehyde, the average polymerization degree of 1700, the content of the hydroxyl group of 30.5% by mole, the acetylation degree of 1% by mole, the butyralization degree of 68.5% by mole)

PVB2 (Polyvinyl acetal resin: a polyvinyl butyral resin acetalized with n-butyraldehyde, the average polymerization degree of 3000, the content of the hydroxyl group of 22% by mole, the acetylation degree of 13% by mole, the butyralization degree of 65% by mole)

In this connection, the content of the hydroxyl group, the acetylation degree, and the acetalization degree (butyralization degree) were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)

Triethylene glycol di-2-ethylhexanoate (3GO)

(Heat Shielding Compound)

ITO Particles

NIR-43V (a vanadium phthalocyanine compound, "NIR-43V" available from YAMADA CHEMICAL CO., LTD.)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

H-BHT (2,6-di-t-butyl-4-methylphenol, "H-BHT" available from Sakai Chemical Industry Co., Ltd.)

(Example 1)

Preparation of Composition for Forming Portion (Including First Region) Excluding Second Region:

One hundred parts by weight of a polyvinyl acetal resin (PVB1), 40 parts by weight of a plasticizer (3GO), a heat shielding compound (ITO particles) in an amount that the content thereof in the resulting interlayer film becomes 0.15% by weight, a heat shielding compound (NIR-43V) in an amount that the content thereof in the resulting interlayer film becomes 0.0085% by weight, 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a portion excluding a second region.

Preparation of Composition for Forming Second Region:

One hundred parts by weight of a polyvinyl acetal resin (PVB1), 40 parts by weight of a plasticizer (3GO), 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a second region.

Preparation of Interlayer Film:

An interlayer film shown in FIG. 1 was prepared.

The composition for forming a portion excluding a second region and the composition for forming a second region were extruded using an extruder to prepare an interlayer film having a sectional shape in the thickness direction of a wedge-like shape. In the thickest portion of the interlayer film, a first region and a second region were formed. The thickness Tmax of the thickest portion of the interlayer film, the thickness Tmin of the thinnest portion of the interlayer film, the absolute value X(|Tmax−Tmin|) of a difference in thickness, and the thickness Y of a thickest portion in the second region were shown in the following Table 1. In this connection, the second region was determined to have a thickness of one end thinner than the thickness of the other end and was determined to be a region having a sectional shape in the thickness direction of a wedge-like shape, and the direction from one end to the other end of the interlayer film and the direction from one end to the other end of the second region R2 were determined to be aligned with each other. Moreover, the other end of the second region and the other end of the interlayer film were determined to be positionally aligned with each other and the distance from one end to the other end of the second region was determined to be 0.25Z relative to the distance Z from one end to the other end of the interlayer film.

Preparation of Laminated Glass:

A test piece (interlayer film portion) of 50 mm (in a direction connecting the one end and the other end)×50 mm (in a direction orthogonal to the direction connecting the one end and the other end) was sampled by a sampling method described above from each of the thickest portion of the interlayer film and the thinnest portion of the interlayer film.

Next, two sheets of heat ray-absorbing plate glass (50 mm×50 mm×2.1 mm in thickness) in accordance with JIS R3208 were prepared. The interlayer film obtained was sandwiched between the two sheets of heat ray-absorbing plate glass and held in place and pressed under vacuum at 90° C. for 30 minutes with a vacuum laminator to obtain a laminate. With regard to the laminate, interlayer film portions protruded from the glass plate were cut away to obtain a sheet of laminated glass.

(Examples 2 to 11)

An interlayer film was obtained in the same manner as that in Example 1 except that the kind of ingredients to be compounded and the content thereof for the first region and second region of the interlayer film were set to those listed in the following Tables 1 and 2 and the thickness Tmax of the thickest portion of the interlayer film, the thickness Tmin of the thinnest portion of the interlayer film, the absolute value X(|Tmax−Tmin|) of a difference in thickness, and the thickness Y of a thickest portion in the second region were set to those listed in the following Tables 1 and 2. With the use of the interlayer film obtained, a sheet of laminated glass was obtained in the same manner as that in Example 1.

(Comparative Example 1)

Preparation of Composition for Forming Interlayer Film:

One hundred parts by weight of a polyvinyl acetal resin (PVB1), 40 parts by weight of a plasticizer (3GO), a heat shielding compound (ITO particles) in an amount that the content thereof in the resulting interlayer film becomes 0.15% by weight, a heat shielding compound (NIR-43V) in an amount that the content thereof in the resulting interlayer film becomes 0.0085% by weight, 0.2 parts by weight of an ultraviolet ray screening agent (Tinuvin 326), and 0.2 parts by weight of an oxidation inhibitor (H-BHT) were thoroughly mixed using a mixing roll to obtain a composition for forming an interlayer film.

Preparation of Interlayer Film:

Unlike the interlayer film shown in FIG. 1, an interlayer film in which no second region is formed was prepared.

Only the composition for forming an interlayer film was extruded using an extruder to prepare an interlayer film having a sectional shape in the thickness direction of a wedge-like shape. The thickness Tmax of the thickest portion of the interlayer film, the thickness Tmin of the thinnest portion of the interlayer film, and the absolute value X(|Tmax−Tmin|) of a difference in thickness were shown in the following Table 1. In the thickest portion of the interlayer film, no second region was formed.

With the use of the interlayer film obtained, a sheet of laminated glass was obtained in the same manner as that in Example 1.

(Comparative Examples 2, 3)

An interlayer film was obtained in the same manner as that in Example 1 except that the kind of ingredients to be compounded and the content thereof for the first region of the interlayer film were set to those listed in the following Table 2 and the thickness Tmax of the thickest portion of the interlayer film, the thickness Tmin of the thinnest portion of the interlayer film, the absolute value X(|Tmax−Tmin|) of a difference in thickness, and the thickness Y of a thickest portion in the second region were set to those listed in the following Table 2. With the use of the interlayer film obtained, a sheet of laminated glass was obtained in the same manner as that in Example 1.

(Example 12)

Preparation of Composition (1) for Forming Portion (Including First Region) Excluding Second Region:

One hundred parts by weight of a polyvinyl acetal resin (PVB1), 40 parts by weight of a plasticizer (3GO), a heat shielding compound (ITO particles) in an amount that the content thereof in the resulting interlayer film becomes 0.17% by weight, a heat shielding compound (NIR-43V) in an amount that the content thereof in the resulting interlayer film becomes 0.0098% by weight, 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a portion excluding a second region.

Preparation of Composition (2) for Forming Portion Excluding Second Region:

One hundred parts by weight of a polyvinyl acetal resin (PVB2), 60 parts by weight of a plasticizer (3GO), 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a portion excluding a second region.

Preparation of Composition for Forming Second Region:

One hundred parts by weight of a polyvinyl acetal resin (PVB1), 40 parts by weight of a plasticizer (3GO), 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a second region.

Preparation of Interlayer Film:

An interlayer film shown in FIG. 8 was prepared. In this connection, the composition (1) for forming a portion excluding a second region was used for second and third layers 2G, 3G, the composition (2) for forming a portion excluding a second region was used for a first layer 1G, and the composition for forming a second region was used for a second region R2 in the second layer 2G. The thickness of 1G was determined to be 0.1 mm.

The composition (1) for forming a portion excluding a second region, the composition (2) for forming a portion excluding a second region, and the composition for forming a second region were extruded using an extruder to prepare an interlayer film having a sectional shape in the thickness direction of a wedge-like shape. In the thickest portion of the interlayer film, first regions (2G, 3G), a second region (R2), and a region (1G) other than those were formed. The thickness Tmax of the thickest portion of the interlayer film, the thickness Tmin of the thinnest portion of the interlayer film, the absolute value X(|Tmax−Tmin|) of a difference in thickness, and the thickness Y of a thickest portion in the second region were shown in the following Table 1. In this connection, in the second region, the thickness of one end was determined to be thinner than the thickness of the other end, the sectional shape in the thickness direction was determined to be a wedge-like shape, and the direction from one end to the other end of the interlayer film and the direction from one end to the other end of the second region R2 were determined to be aligned with each other. Moreover, the other end of the second region and the other end of the interlayer film were determined to be positionally aligned with each other and the distance from one end to the other end of the second region was determined to be 0.25Z relative to the distance Z from one end to the other end of the interlayer film.

Preparation of Laminated Glass:

With the use of the interlayer film obtained, a sheet of laminated glass was obtained in the same manner as that in Example 1.

(Examples 13 to 22)

An interlayer film was obtained in the same manner as that in Example 12 except that the kind of ingredients to be compounded and the content thereof for the first region and second region of the interlayer film were set to those listed in the following Table 3 and the thickness Tmax of the thickest portion of the interlayer film, the thickness Tmin of the thinnest portion of the interlayer film, the absolute value X(|Tmax−Tmin|) of a difference in thickness, and the thickness Y of a thickest portion in the second region were set to those listed in the following Table 3. With the use of the interlayer film obtained, a sheet of laminated glass was obtained in the same manner as that in Example 1.

(Comparative Example 4)

Preparation of Composition (1) for Forming Interlayer Film:

One hundred parts by weight of a polyvinyl acetal resin (PVB1), 40 parts by weight of a plasticizer (3GO), a heat shielding compound (ITO particles) in an amount that the content thereof in the resulting interlayer film becomes 0.17% by weight, a heat shielding compound (NIR-43V) in an amount that the content thereof in the resulting interlayer film becomes 0.0098% by weight, 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a portion excluding a second region.

Preparation of Composition (2) for Forming Interlayer Film:

One hundred parts by weight of a polyvinyl acetal resin (PVB2), 60 parts by weight of a plasticizer (3GO), 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a third region.

Preparation of Interlayer Film:

In the interlayer film shown in FIG. 8, an interlayer film in which no second region is formed was prepared. In this connection, the composition (1) for forming a portion excluding a second region was used for 2G and 3G and the composition (2) for forming a portion excluding a second region was used for 1G. The thickness of 1G was determined to be 0.1 mm.

Only the composition (1) for forming an interlayer film and the composition (2) for forming an interlayer film were extruded using an extruder to prepare an interlayer film having a sectional shape in the thickness direction of a wedge-like shape. The thickness Tmax of the thickest portion of the interlayer film, the thickness Tmin of the thinnest portion of the interlayer film, and the absolute value X(|Tmax−Tmin|) of a difference in thickness were shown in the following Table 3. In the thickest portion of the interlayer film, no second region was formed.

Preparation of Laminated Glass:

With the use of the interlayer film obtained, a sheet of laminated glass was obtained in the same manner as that in Example 1.

(Comparative Examples 5, 6)

An interlayer film was obtained in the same manner as that in Example 1 except that the kind of ingredients to be compounded and the content thereof for the first region of the interlayer film were set to those listed in the following Table 3 and the thickness Tmax of the thickest portion of the interlayer film, the thickness Tmin of the thinnest portion of the interlayer film, the absolute value X(|Tmax−Tmin|) of a difference in thickness, and the thickness Y of a thickest portion in the second region were set to those listed in the following Table 3. With the use of the interlayer film obtained, a sheet of laminated glass was obtained in the same manner as that in Example 1.

(Evaluation)

(1) Thickness of Interlayer Film

The thickness Tmax of the thickest portion of an interlayer film, the thickness Tmin of the thinnest portion of an interlayer film, the absolute value X(|Tmax−Tmin|) of a difference in thickness, and the thickness Y of a thickest portion in a second region were evaluated.

(2) Measurement of Visible Light Transmittance (a Light Y Value, Initial A-Y (380 to 780 nm))

With the use of a spectrophotometer ("U-4100" available from Hitachi High-Technologies Corporation), the sheet of laminated glass obtained was measured for the visible light transmittance in the wavelength of 380 to 780 nm in accordance with JIS R3211 (1998).

(3) Measurement of Solar Transmittance (Initial Ts2500 (300 to 2500 nm))

With the use of a spectrophotometer ("U-4100" available from Hitachi High-Technologies Corporation), the solar transmittance Ts (Ts2500) in the wavelength of 300 to 2500 nm of the sheet of laminated glass obtained was determined in accordance with JIS R3106 (1998).

The details of the interlayer film and the results are shown in the following Tables 1 to 3. In this connection, in the following Tables 1 to 3, only a content of the heat shielding compound was described and the description of contents of the polyvinyl acetal resin, the plasticizer, the ultraviolet ray screening agent, and the oxidation inhibitor was omitted. In all of the examples and comparative examples, relative to 100 parts by weight of a polyvinyl acetal resin, 40 parts by weight of a plasticizer, 0.2 parts by weight of an ultraviolet ray screening agent (Tinuvin 326), and 0.2 parts by weight of an oxidation inhibitor (H-BHT) were used.

TABLE 1

| | | | Example 1 | Example 2 | Example 3 | Example 4 | Example 5 | Example 6 | Example 7 | Comparative Example 1 |
|---|---|---|---|---|---|---|---|---|---|---|
| First region: content of heat shielding compound | ITO particles | % by weight | 0.15 | 0.15 | 0.15 | 0.15 | 0.15 | 0.15 | 0.15 | 0.15 |
| | CWO | % by weight | 0 | 0 | 0 | 0 | 0 | 0 | 0 | 0 |
| | NIR-43V | % by weight | 0.0085 | 0.0085 | 0.0085 | 0.0085 | 0.0085 | 0.0085 | 0.0085 | 0.0085 |
| Second region: content of heat shielding compound | ITO particles | % by weight | 0 | 0 | 0 | 0 | 0 | 0 | 0 | — |
| | CWO | % by weight | 0 | 0 | 0 | 0 | 0 | 0 | 0 | — |
| | NIR-43V | % by weight | 0 | 0 | 0 | 0 | 0 | 0 | 0 | — |
| Interlayer film | Tmax | mm | 1.56 | 1.56 | 1.46 | 1.36 | 1.26 | 1.16 | 1.06 | 1.46 |
| | Tmin | mm | 0.76 | 0.76 | 0.76 | 0.76 | 0.76 | 0.76 | 0.76 | 0.76 |
| | X(|Tmax − Tmin|) | mm | 0.8 | 0.8 | 0.7 | 0.6 | 0.5 | 0.4 | 0.3 | 0.7 |
| Second region | Y | mm | 0.52 | 0.8 | 0.42 | 0.32 | 0.22 | 0.12 | 0.02 | 0 |
| A-Y of thickest portion | | % | 73.1 | 74.8 | 73.2 | 73.1 | 73.4 | 73.1 | 73.1 | 70.8 |
| A-Y of thinnest portion | | % | 75 | 75 | 75 | 75 | 75 | 75 | 75 | 75 |
| Absolute value of difference between A-Y of thickest portion and A-Y of thinnest portion | | % | 1.9 | 0.2 | 1.8 | 1.9 | 1.6 | 1.9 | 1.9 | 4.2 |
| Ts2500 of thickest portion | | % | 36.3 | 38.7 | 36.3 | 36.3 | 36.3 | 36.3 | 36.3 | 33.4 |
| Ts2500 of thinnest portion | | % | 37.8 | 37.8 | 37.8 | 37.8 | 37.8 | 37.8 | 37.8 | 37.8 |
| Absolute value of difference between Ts2500 of thickest portion and Ts2500 of thinnest portion | | % | 1.5 | −0.9 | 1.5 | 1.5 | 1.5 | 1.5 | 1.5 | 4.4 |

TABLE 2

|  |  |  | Example 8 | Example 9 | Comparative Example 2 | Example 10 | Comparative Example 3 | Example 11 |
|---|---|---|---|---|---|---|---|---|
| First region: content of heat shielding compound | ITO particles | % by weight | 0 | 0.15 | 0.15 | 0 | 0 | 0.15 |
|  | CWO | % by weight | 0 | 0 | 0 | 0.05 | 0.05 | 0 |
|  | NIR-43V | % by weight | 0.01 | 0 | 0.0085 | 0 | 0 | 0.0085 |
| Second region: content of heat shielding compound | ITO particles | % by weight | 0 | 0 | — | 0 | — | 0.01 |
|  | CWO | % by weight | 0 | 0 | — | 0 | — | 0 |
|  | NIR-43V | % by weight | 0 | 0 | — | 0 | — | 0 |
| Interlayer film | Tmax | mm | 1.56 | 1.56 | 1.76 | 1.56 | 1.76 | 1.56 |
|  | Tmin | mm | 0.76 | 0.76 | 0.76 | 0.76 | 0.76 | 0.76 |
|  | X(\|Tmax − Tmin\|) | mm | 0.8 | 0.8 | 1 | 0.8 | 1 | 0.8 |
| Second region | Y | mm | 1.48 | 1.48 | 0 | 0.52 | 0 | 0.52 |
| A-Y of thickest portion |  | % | 78.4 | 78.8 | 70.1 | 72.6 | 68.5 | 72.9 |
| A-Y of thinnest portion |  | % | 74.7 | 78 | 78 | 74.2 | 74.2 | 74.5 |
| Absolute value of difference between A-Y of thickest portion and A-Y of thinnest portion |  | % | −3.7 | −0.8 | 7.9 | 1.6 | 5.7 | 1.6 |
| Ts2500 of thickest portion |  | % | 49.8 | 49.9 | 32.0 | 37.0 | 31.5 | 35.3 |
| Ts2500 of thinnest portion |  | % | 43.7 | 44.2 | 44.2 | 39.8 | 39.8 | 37.8 |
| Absolute value of difference between Ts2500 of thickest portion and Ts2500 of thinnest portion |  | % | −6.1 | −5.7 | 12.2 | 2.8 | 8.3 | 2.5 |

TABLE 3

|  |  |  | Example 12 | Example 13 | Example 14 | Example 15 | Example 16 | Example 17 | Example 18 | Comparative Example 4 |
|---|---|---|---|---|---|---|---|---|---|---|
| Content of heat shielding compound | ITO particles | % by weight | 0.17 | 0.17 | 0.17 | 0.17 | 0.17 | 0.17 | 0.17 | 0.17 |
|  | CWO | % by weight | 0 | 0 | 0 | 0 | 0 | 0 | 0 | 0 |
|  | NIR-43V | % by weight | 0.0098 | 0.0098 | 0.0098 | 0.0098 | 0.0098 | 0.0098 | 0.0098 | 0.0098 |
| Entire thickness of layers of interlayer film | Tmax | mm | 1.56 | 1.56 | 1.46 | 1.36 | 1.26 | 1.16 | 1.06 | 1.46 |
|  | Tmin | mm | 0.76 | 0.76 | 0.76 | 0.76 | 0.76 | 0.76 | 0.76 | 0.76 |
|  | X(\|Tmax − Tmin\|) | mm | 0.8 | 0.8 | 0.7 | 0.6 | 0.5 | 0.4 | 0.3 | 0.7 |
| Second region | Y | mm | 0.52 | 0.8 | 0.42 | 0.32 | 0.22 | 0.12 | 0.02 | 0 |
| A-Y of thickest portion |  | % | 73.1 | 74.8 | 73.2 | 73.1 | 73.4 | 73.1 | 73.1 | 70.8 |
| A-Y of thinnest portion |  | % | 75 | 75 | 75 | 75 | 75 | 75 | 75 | 75 |
| Absolute value of difference between A-Y of thickest portion and A-Y of thinnest portion |  | % | 1.9 | 0.2 | 1.8 | 1.9 | 1.6 | 1.9 | 1.9 | 4.2 |
| Ts2500 of thickest portion |  | % | 36.3 | 38.7 | 36.3 | 36.3 | 36.3 | 36.3 | 36.3 | 33.4 |
| Ts2500 of thinnest portion |  | % | 37.8 | 37.8 | 37.8 | 37.8 | 37.8 | 37.8 | 37.8 | 37.8 |
| Absolute value of difference between Ts2500 of thickest portion and Ts2500 of thinnest portion |  | % | 1.5 | −0.9 | 1.5 | 1.5 | 1.5 | 1.5 | 1.5 | 4.4 |

|  |  |  | Example 19 | Example 20 | Comparative Example 5 | Example 21 | Comparative Example 6 | Example 22 |
|---|---|---|---|---|---|---|---|---|
| Content of heat shielding compound | ITO particles | % by weight | 0 | 0.17 | 0.17 | 0 | 0 | 0.17 |
|  | CWO | % by weight | 0 | 0 | 0 | 0.058 | 0.058 | 0 |
|  | NIR-43V | % by weight | 0.0115 | 0 | 0.0098 | 0 | 0 | 0.0098 |

TABLE 3-continued

| | | | | | | | | |
|---|---|---|---|---|---|---|---|---|
| Entire thickness of layers of interlayer film | Tmax | mm | 1.56 | 1.56 | 1.76 | 1.56 | 1.76 | 1.56 |
| | Tmin | mm | 0.76 | 0.76 | 0.76 | 0.76 | 0.76 | 0.76 |
| | X(\|Tmax − Tmin\|) | mm | 0.8 | 0.8 | 1 | 0.8 | 1 | 0.8 |
| Second region | Y | mm | 1.48 | 1.48 | 0 | 0.52 | 0 | 0.52 |
| A-Y of thickest portion | | % | 76.4 | 78.8 | 70.1 | 72.6 | 68.5 | 72.9 |
| A-Y of thinnest portion | | % | 74.7 | 78 | 78 | 74.2 | 74.2 | 74.5 |
| Absolute value of difference between A-Y of thickest portion and A-Y of thinnest portion | | % | −3.7 | −0.8 | 7.9 | 1.6 | 5.7 | 1.6 |
| Ts2500 of thickest portion | | % | 49.8 | 49.9 | 32.0 | 37.0 | 31.5 | 35.3 |
| Ts2500 of thinnest portion | | % | 43.7 | 44.2 | 44.2 | 39.8 | 39.8 | 37.8 |
| Absolute value of difference between Ts2500 of thickest portion and Ts2500 of thinnest portion | | % | −6.1 | −5.7 | 12.2 | 2.8 | 8.3 | 2.5 |

In this connection, sheets of laminated glass prepared with interlayer films obtained in examples were determined to be excellent in uniformity of the visibility because the sheets of laminated glass have a small variation in the visible light transmittance. Confirmation of the uniformity of the visibility was performed by visual observation.

EXPLANATION OF SYMBOLS 1, 1A, 1B, 1C, 1D, 1E, 1F, 1G: First layer
2A, 2B, 2C, 2D, 2E, 2F, 2G: Second layer
2Fa: Portion having sectional shape in thickness direction of rectangular shape
2Fb: Portion having sectional shape in thickness direction of wedge-like shape
3A, 3B, 3C, 3D: Third layer
11, 11A, 11B, 11C, 11D, 11E, 11F, 11G: Interlayer film
11a: One end
11b: The other end
21: Laminated glass
22: Lamination glass member
23: Lamination glass member

The invention claimed is:

1. An interlayer film for laminated glass, the interlayer film containing a polyvinyl acetal resin and a heat shielding compound and having an one end and an other end being at an opposite side of the one end, and the other end having a thickness thicker than the one end,
   the absolute value of a difference between the thickness of a thickest portion and the thickness of a thinnest portion being 0.1 mm or more,
   a distance between the one end and the other end of the interlayer film being 0.5 m or more, and
   in a sheet of laminated glass prepared by sandwiching the interlayer film between two sheets of heat ray-absorbing plate glass with a thickness of 2.1 mm, the absolute value of a difference between the visible light transmittance at the thickest portion of the interlayer film and the visible light transmittance at the thinnest portion of the interlayer film being 4% or less,
   wherein, in the thickness direction of the thickest portion of the interlayer film, a first region and a second region having a content of the heat shielding compound smaller than the first region exist, and
   the second region is positioned only between 0.5Z to Z when the distance from the one end to the other end of the interlayer film is defined as Z and the one end and the other end are set to 0Z and Z respectively,
   wherein, when the interlayer film is a multi-layered interlayer film and the multi-layered interlayer film has a colored band area or a colored region, 1) a surface layer has the colored band area, the colored band area containing a polyvinyl acetal resin, or 2) a surface layer has the colored region, the colored region containing a polyvinyl acetal resin,
   wherein the second region of the interlayer film contains the heat shielding compound, a content of the heat shielding compound in the second region being 0.5% by weight or less and greater than 0% by weight, and
   wherein, in a sheet of laminated glass prepared by sandwiching the interlayer film between two sheets of heat ray-absorbing plate glass with a thickness of 2.1 mm, the absolute value of a difference between the solar transmittance at the thickest portion of the interlayer film and the solar transmittance at the thinnest portion of the interlayer film is 5.5% or less.

2. The interlayer film for laminated glass according to claim 1, wherein the absolute value of a difference between the content of the heat shielding compound in the first region of the interlayer film and the content of the heat shielding compound in the second region of the interlayer film is 0.0001% by weight or more.

3. The interlayer film for laminated glass according to claim 1, wherein, when the absolute value of a difference between the thickness of the thickest portion and the thickness of the thinnest portion is defined as X mm, X mm is more than 0.28 and
   the thickness of a thickest portion in the second region is (X−0.28) or more and X or less.

4. The interlayer film for laminated glass according to claim 1, wherein the heat shielding compound is constituted of at least one kind of ingredient among a phthalocyanine compound, a naphthalocyanine compound, and an anthracyanine compound or is constituted of heat shielding particles.

5. The interlayer film for laminated glass according to claim 4, wherein the heat shielding compound is constituted of the heat shielding particles.

6. The interlayer film for laminated glass according to claim 4, wherein the heat shielding compound is constituted of tin-doped indium oxide particles or tungsten oxide particles as the heat shielding particles.

7. The interlayer film for laminated glass according to claim 4, wherein the heat shielding compound is constituted of at least one kind of the ingredient among a phthalocyanine compound, a naphthalocyanine compound, and an anthracyanine compound.

8. The interlayer film for laminated glass according to claim 1, further containing a plasticizer.

9. The interlayer film for laminated glass according to claim 1, further having a portion with a sectional shape in the thickness direction of a wedge-like shape.

10. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

11. The interlayer film for laminated glass according to claim 1, wherein in a sheet of laminated glass prepared by sandwiching the interlayer film between two sheets of heat ray-absorbing plate glass with a thickness of 2.1 mm, the lower visible light transmittance among the visible light transmittance at the thickest portion of the interlayer film and the visible light transmittance at the thinnest portion of the interlayer film is 65% or more.

12. The interlayer film for laminated glass according to claim 1, further comprising at least one kind of metal salt selected from the group consisting of an alkali metal salt, an alkaline earth metal salt, and a magnesium salt.

13. The interlayer film for laminated glass according to claim 12, wherein the metal salt is a magnesium salt.

14. The interlayer film for laminated glass according to claim 1, wherein the interlayer film is the multi-layered interlayer film and the multi-layered interlayer film has a colored band area or a colored region.

15. The interlayer film for laminated glass according to claim 1, further comprising at least one oxidation inhibitor selected from the group consisting of a phenol-based oxidation inhibitor, a sulfur-based oxidation inhibitor, and a phosphorus-based oxidation inhibitor.

16. The interlayer film for laminated glass according to claim 1, further comprising an ultraviolet ray screening agent, the ultraviolet ray screening agent comprising at least one selected from the group consisting of platinum particles, platinum particles coated with silica, palladium particles, and palladium particles coated with silica.

17. The interlayer film for laminated glass according to claim 16, wherein the ultraviolet ray screening agent further comprises a metal oxide coated with at least one selected from the group consisting of an insulating metal oxide, a hydrolyzable organosilicon compound, and a silicone compound.

* * * * *